(12) United States Patent
Lai et al.

(10) Patent No.: US 7,081,932 B2
(45) Date of Patent: Jul. 25, 2006

(54) DISPLAY MODULE

(75) Inventors: Hsin-Chieh Lai, Hsinchu (TW); Chi-Jen Huang, Taichung (TW); Hong-Chen Kao, Taipei (TW)

(73) Assignee: Hannstar Display Corporation, Taoyuan (TW)

( * ) Notice: Subject to any disclaimer, the term of this patent is extended or adjusted under 35 U.S.C. 154(b) by 12 days.

(21) Appl. No.: 10/828,131

(22) Filed: Apr. 19, 2004

(65) Prior Publication Data

US 2005/0185110 A1    Aug. 25, 2005

(30) Foreign Application Priority Data

Feb. 19, 2004   (TW) .............................. 93104043 A

(51) Int. Cl.
*G02F 1/1333* (2006.01)
(52) U.S. Cl. .................... 349/58; 349/60; 349/361; 349/681
(58) Field of Classification Search ................ 349/58, 349/60; 361/681
See application file for complete search history.

(56) References Cited

U.S. PATENT DOCUMENTS

| 6,216,329 | B1 * | 4/2001 | Kaga et al. ................... 29/458 |
| 6,494,429 | B1 * | 12/2002 | Tajima ....................... 248/473 |
| RE38,516 | E * | 5/2004 | Hasegawa et al. ........... 349/58 |
| 2003/0103173 | A1 * | 6/2003 | Satonaka ..................... 349/58 |

* cited by examiner

*Primary Examiner*—Huyen Ngo
(74) *Attorney, Agent, or Firm*—J.C. Patents

(57) ABSTRACT

A display module is provided. The display module comprises: a display panel; a peripheral module; and a damper structure disposed between the display panel and the peripheral module. The damper structure comprises a fixed portion on the peripheral module; a supporting portion attached to a surface of the display panel; and a middle portion connected to and between the fixed portion and the supporting portion. Hence, the damper structure provides better support to prevent the light leakage from the gap between the display panel and the peripheral module, and provides better stress buffer during the impact test or other external forces so as to protect the liquid crystal panel from damage.

20 Claims, 6 Drawing Sheets

DISPLAY MODULE

CROSS-REFERENCE TO RELATED APPLICATION

This application claims the priority benefit of Taiwan application serial no. 93104043, filed on Feb. 19, 2002.

BACKGROUND OF THE INVENTION

1. Field of the Invention

This invention generally relates to a display module, and more particularly to a display module with a damper structure between the display panel and the peripheral module to absorb the external forces.

2. Description of Related Art

As the computer provides more powerful functions, and with advancement of the Internet and multimedia technology, currently the image information can be transmitted in a digital form. To fit the modern living life style, the video or image device is inclined to a compact size. The traditional cathode ray tube (CRT) display had dominated the display market because of its display quality and low cost. However, from environmental or energy-saving point of view, CRT cannot provide a good solution for compact size and low power consumption due to its physical limitation. Hence, the newly developed flat panel display using the optoelectronics and semiconductor manufacturing technology, such as liquid crystal display (LCD) has been largely accepted. Organic light emitting diode (OLED), or plasma display panel (PDP) becomes the mainstream in the display market.

The LCD can be classified into reflective LCD, transmissive LCD, and transflective LCD depending on the type of the light sources. Taking the transmissive LCD or transflective LCD as an example, it comprises a liquid crystal panel and a peripheral module. Because the liquid crystal injected into the liquid crystal panel is not self-illuminent, the peripheral module can provide the light source for the liquid crystal panel in order to display.

The peripheral module is generally classified into the edge-type backlight module and the direct-type backlight module. The edge-type backlight module comprises a light guide plate, a cold cathode fluorescent lamp (CCFL) and a reflecting cover to provide the light source for the liquid crystal panel. The direct-type backlight module may be a cold cathode fluorescent flat lamp (CCFFL), a plurality of CCFLs parallel each other or a plurality of light emitting diodes array (LED array) to provide the plane light source for the liquid crystal panel. In addition, both of the edge-type backlight module and the direct-type backlight module comprise a frame to support the light source mentioned above so as to integrate several elements into a single plane light source.

It should be noted that when assembling the LCD, the liquid crystal panel is disposed on the frame of the backlight, and the bezel will cover the frame and the liquid crystal panel in order to fix the relative position of the liquid crystal panel and the peripheral module. In addition, the conventional LCD generally comprises a buffer pad (e.g., silicon rubber) between the frame and the liquid crystal panel as a buffer. However, because the size and the weight of the liquid crystal panel become larger and larger, the buffer pad cannot provide enough support and buffer for the LCD. Hence, during the impact test or transportation, the liquid crystal panel may be broken due to the external forces to the liquid crystal panel or to the frame. In addition, a light leakage may occur due to a gap between the frame and the liquid crystal panel in the display module. Hence, a solution is necessary to improve these problems.

SUMMARY OF THE INVENTION

Accordingly, the present invention is directed to a display module comprising a first sub-module, a second sub-module, a damper structure or a damper element disposed therebetween. The first sub-module can be a display panel, and the second sub-module can be a peripheral module containing the display panel, wherein the first or second sub-module is not limited in the display panel or the peripheral module. The damper structure between the display panel and the peripheral module to provide better support and stress buffer. The display panel, the damper structure and the peripheral module are arranged in the horizontal or vertical direction.

According to an embodiment of the present invention, the display module comprises: a display panel; a peripheral module; and a damper structure disposed between the display panel and the peripheral module. The damper structure may comprise a fixed portion disposed on the peripheral module; a supporting portion attached to a surface of the display panel; and a middle portion connected to and between the fixed portion and the supporting portion.

According to the present invention, the damper structure may be disposed between the display panel and the back light module for contacting either the lateral sides or the back of the display panel. The damper structure can be fixed on the peripheral module via a screw, an indentation for wedging or sliding.

In an embodiment of the present invention, the display module comprises a first buffer pad disposed between the frame and the display panel. The display module may further comprise a second buffer pad disposed between the damper structure and the display panel. Furthermore, the display module may comprise a bezel disposed on the display panel and the surface of the display panel is attached to the bezel.

In an embodiment of the present invention, the peripheral module comprises: a frame and a light source on the frame, wherein the damper structure is disposed around an outer circumference of the frame to enclose the light source. The damper structure is disposed around the circumference of the frame. The frame comprises a trough; the trough is located around the outer circumference of the frame to accommodate the damper structure; the damper structure has a height larger than a depth of the trough.

In an embodiment of the present invention, the middle portion comprises one or more supporting components disposed between the supporting portion and the fixed portion. The supporting component may be different types. For example, the supporting component may be a plate, which is not coplanar with the supporting portion and the fixed portion and connected between the supporting portion and the fixed portion. The supporting component is capable of redirecting vertical force from the fixed portion to the supporting portion, or vertical force from the supporting portion to the fixed portion. The supporting component may comprise a first plate and a second plate adjacent to each other but not coplanar. The first plate and the second plate are connected in an area outside or inside a space between the supporting portion and the fixed portion. The supporting component can comprise a plurality of adjacent plates, the adjacent plates being not coplanar with each other.

In an embodiment of the present invention, the damper structure comprises a stress-buffering member between the supporting portion and the fixed portion. The stress-buffering member comprises a neck portion. The damper structure and the frame can be integrated together, and the material of the damper structure and the frame comprises at least one of plastic and metal.

In light of the above, the display module of the present invention utilizes the principle of structural passive controlling to dispose a damper structure between the display panel and the peripheral module to absorb the energy. Hence, the damper structure not only provide better support to prevent the light leakage from the gap between the display panel and the peripheral module, but also provide better stress buffer during the impact test or other external forces so as to protect the liquid crystal panel from damage.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE EMBODIMENTS

Figure 1A:
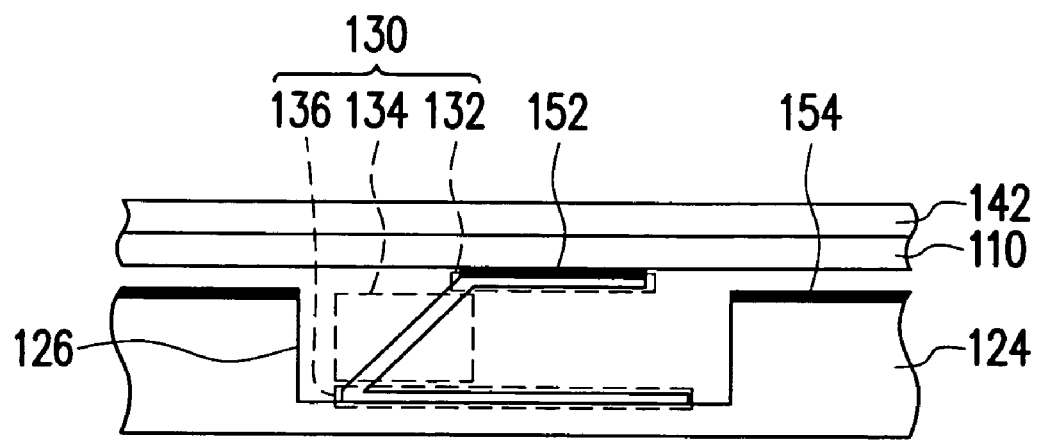
FIG. 1A is a partial cross-sectional view of a display module in accordance with an embodiment of the present invention.
Figure 1B:
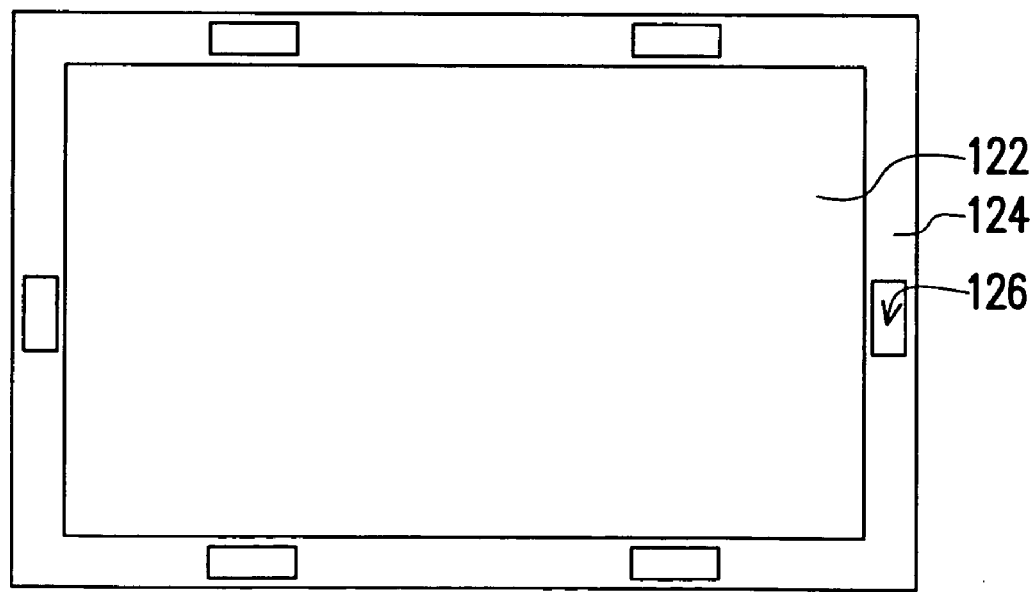
FIG. 1B is the top view of a peripheral module in accordance with an embodiment of the present invention.

FIG. 1A is a partial cross-sectional view of a display module in accordance with an embodiment of the present invention. FIG. 1B is the top view of a peripheral module in accordance with an embodiment of the present invention. Referring to FIGS. 1A and 1B, the display module 100 comprises a display panel 110, a peripheral module such as a backlight 120 and a plurality of damper structures 130. The display panel 110 can be a liquid crystal panel and the backlight 120 comprises at least a light source 122 (for example, light guiding plate, a flat lamp, a cold cathode fluorescent lamp or LED array), and a frame 124 to support the light source 122. The outer circumference of the frame 124 can comprise a plurality of troughs 126. Further, the bezel 142 is attached to the display panel 110 to fix the relative positions of the display panel 110 and the frame 124. Each of the damper structures 130 are disposed in the troughs 126 of the frame 124, respectively, and the height of the damper structure 130 is larger than the depth of the troughs 126 to prevent the display panel contacting the frame 124 and to provide the flexible support and stress buffer.

Referring to FIG. 1A, the material of the damper structure 130 can be, partially or as a whole, plastic, metal or any material with reasonable elasticity. The damper structure can be divided into the supporting portion 132 attached to the surface of the display panel 110, the fixed portion 136 disposed inside the troughs 126, and the middle portion 134 connected between the supporting portion 132 and the fixed portion 136. The middle portion 134, for example, is a plate that is not coplanar with the supporting portion 132 and the fixed portion 136. An included angle between the middle portion 134 and the supporting portion 132/the fixed portion 136 are not orthogonal so as to provide better buffer ability. Further, the fixed portion 136 can be disposed in the trough 126 via a screw, a wedging indentation or a sliding indentation. The supporting portion 132, the middle portion 134, and the fixed portion 136 can be a single component by bending a flexible plate. In addition, a first buffer pad 154 can also be disposed on the frame 124 as a buffer between the display panel 110 and the frame 124. Further, a second buffer pad 152 can be disposed between the supporting portion 132 and the display panel 110 to prevent the damper structure 130 from damaging the surface of the display panel 110. The material of the buffer pads 152 and 154 can be a silicon rubber.

In light of the above, the display module 100 of the present invention utilizes the damper structure 130 as the support between the display panel 110 and the backlight 120 in the vertical direction so that the display panel and the bezel 142 contact each other tightly. Hence, it can effectively prevent the light leakage from the edges of the display panel 110. Further, the damper structure 130 of the present invention can further absorb the energy in the horizontal and vertical directions. Hence when the external forces applied to the display panel 110 in various directions, the damper structure 130 can provide better stress buffer than the conventional art to further protect the display panel 110.

The damper structure 130 can also be disposed on the edges of the display panel 110 to provide the flexible support between the edges of the display panel 110 and the frame 124 of the backlight 120 in the horizontal direction. Because the related devices and configuration are similar to the above, the detail description thereof is omitted. Further, the damper structure 130 can not only be disposed in the trough 126 of the frame 124, but also can be disposed on the surface of the display panel 110 and the backlight 120, or be disposed on the frame 124 and be integrated together.

The damper structure of the present invention can have different shapes depending on the panel size and the design requirement in order to provide different stress buffer ability. The middle portion can comprise one or more supporting components that are disposed between the supporting portion and the fixed portion. In the above embodiment, it is a damper structure with a single supporting component.

Figure 2:
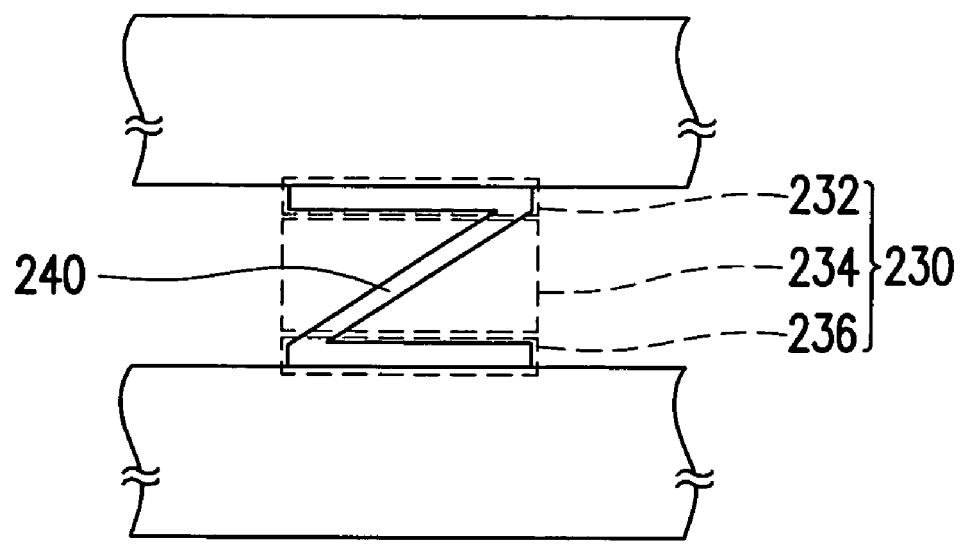
FIGS. 2–5 show the damper structure with a single supporting component in accordance with an embodiment of the present invention.
Figure 3:
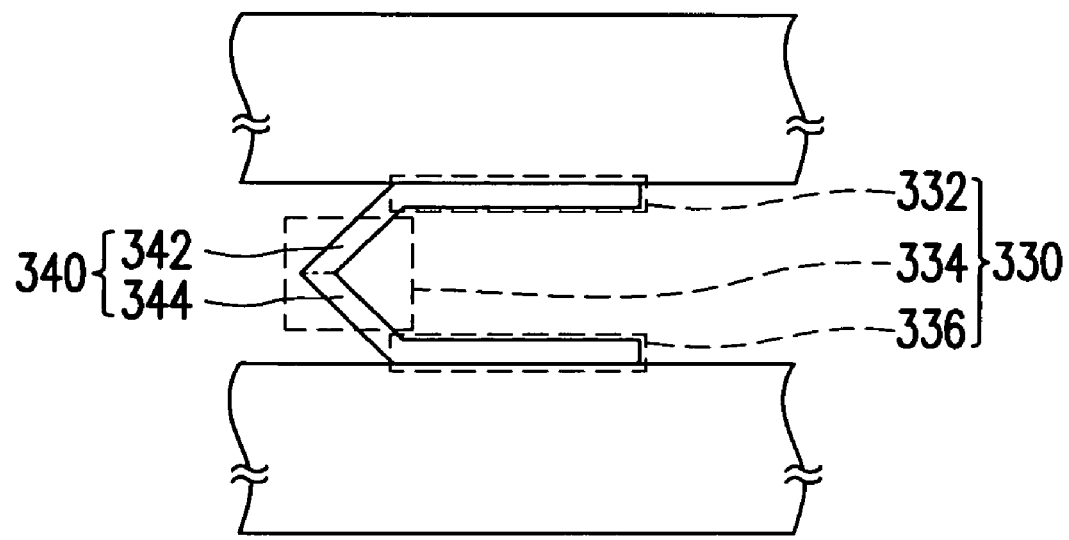
Figure 4:
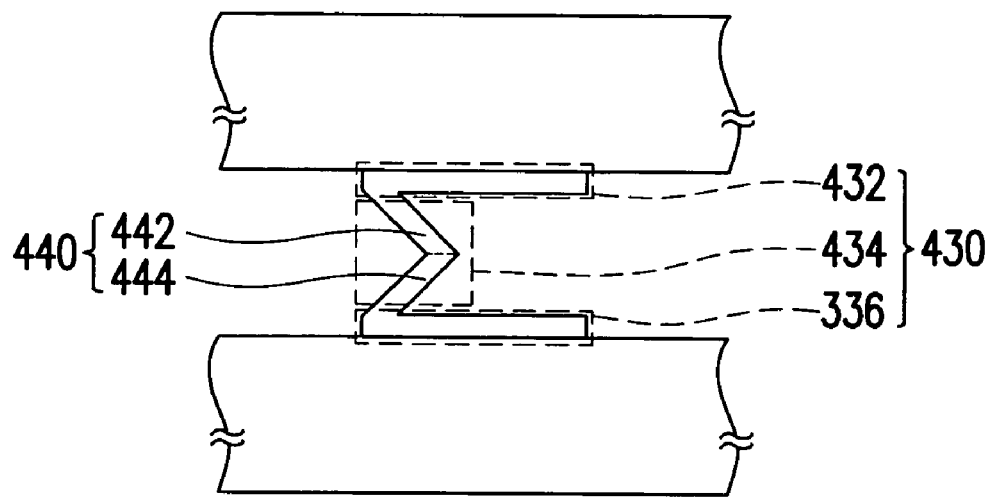
Figure 5:
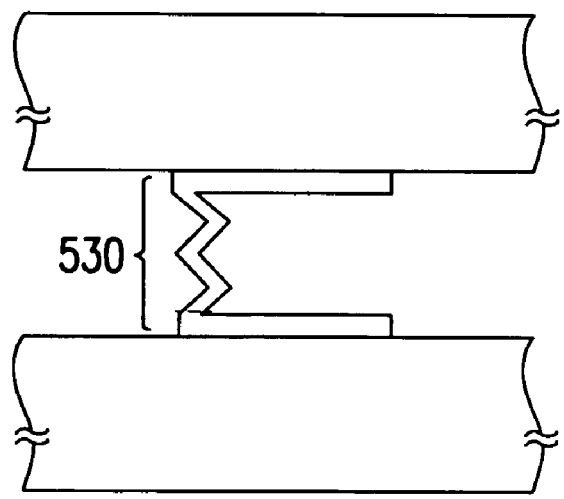

FIGS. 2–5 show the damper structure with a single supporting component in accordance with other embodiments of the present invention. As shown in FIG. 2, the middle portion 234 of the damper structure 230 is a plate-supporting component 240. The plate-supporting component 240 connects the opposite side of the supporting portion 232 and the fixed portion 236 so that the damper structure 230 including the combination of the supporting portion 232, the middle portion 234 and the fixed portion 236 looks like a "Z". As shown in FIG. 3, the supporting component 340 of the damper structure 330 may be a two-fold zigzag structure comprising a first plate 342 and a second plate 344. The first plate 342 and the second plate 344 are connected in an area outside a space between the supporting portion 332 and the fixed portion 336. In addition, as shown in FIG. 4, the supporting component 440 may be a two-fold zigzag structure comprising a first plate 442 and a second plate 444. The first plate 442 and the second plate 444 are connected in an area inside a space between the supporting portion 432 and the fixed portion 436 so that the damper structure 430 including the combination of the supporting portion 432, the middle portion 434 and the fixed portion 436 looks like a "Σ". Likewise, the above supporting component can comprise a plurality of plates, wherein each plate is not coplanar with the others as shown in FIG. 5 to form the damper structure 530.

In addition to the damper structure with a single supporting component, the damper structure of the present invention can comprises two or more supporting components to provide better support between the display panel and the peripheral module. Taking the damper structure with two supporting components as an example, these two supporting components can connect two sides of the supporting portion and the fixed portion respectively to form a damper structure with a frame shaped. Further, when collocating the different structures of the damper structure with a single supporting component in the above embodiments, the damper structure with a frame shaped of FIGS. 6–9 can also be obtained.

Figure 6:
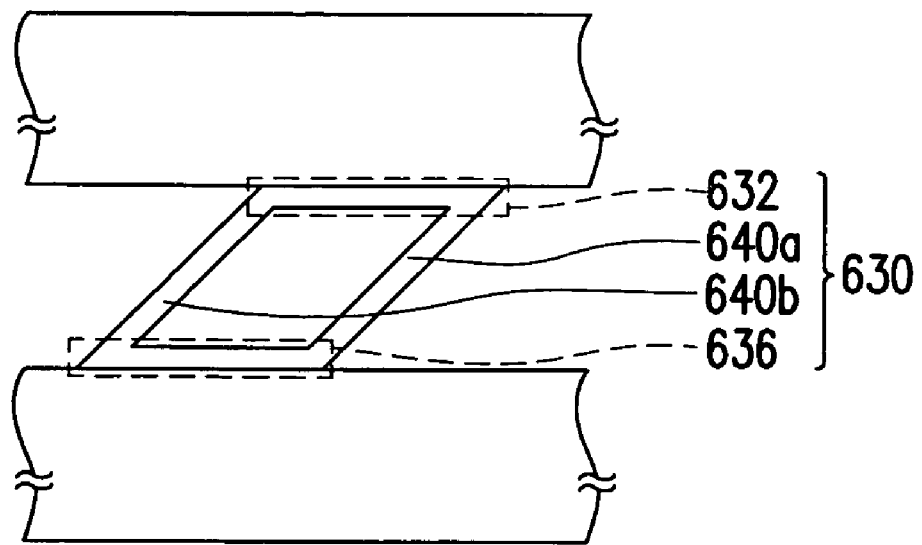
FIGS. 6–9 show the frame damper structure in accordance with an embodiment of the present invention.
Figure 7:
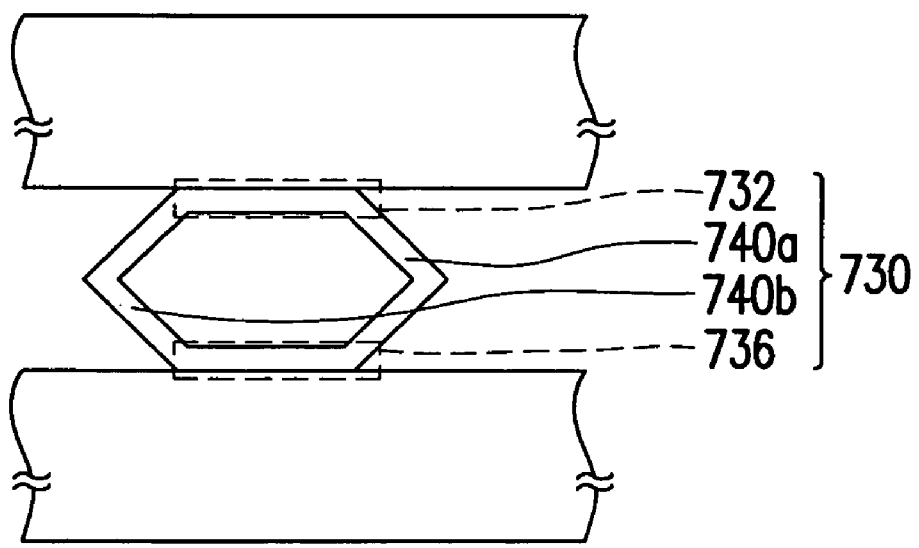
Figure 8:
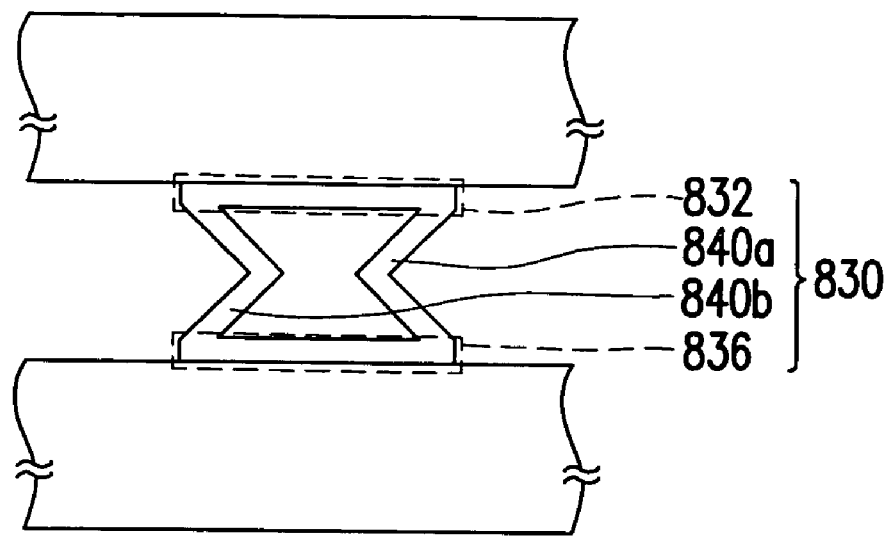
Figure 9:
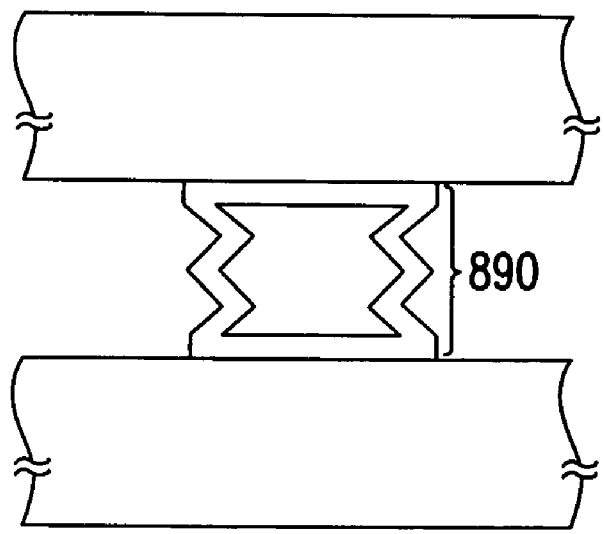

Referring to FIG. 6, the two supporting components 640a and 640b have a plate structure and connect the opposite sides of the supporting portion 632 and the fixed portion 636 so that the combination of the supporting portion 632, the damper structure 630 and the fixed portion 636 becomes a parallelogram. In addition, referring to FIG. 7, the supporting components 740a and 740b are a dual-fold zigzag structure respectively and disposed on the opposite sides of the damper structure 730. The folding points of the supporting components 740a and 740b are outside the space between the supporting portion 732 and the fixed portion 736. In addition, referring to FIG. 8, the supporting components 840a and 840b are a dual-fold zigzag structure respectively and are disposed on the opposite sides of the damper structure 830. The folding points of the supporting components 840a and 840b are inside the space between the supporting portion 832 and the fixed portion 836. In addition, the damper structure of the present invention can also be the damper structure 890 with a multi-fold structure as shown in FIG. 9.

It should be noted that although in the above embodiments the damper structure only has one or two supporting components, more than two supporting components can be used as the middle portion in a practical matter and can be disposed around the circumference of the supporting portion and the fixed portion. Further, the supporting components and their configuration shown in the figures are only used to illustrate the present invention. The supporting component can also be an arc plate, a stripe, or other shape that can absorb the energy and falls within the scope of the present invention.

Figure 10:
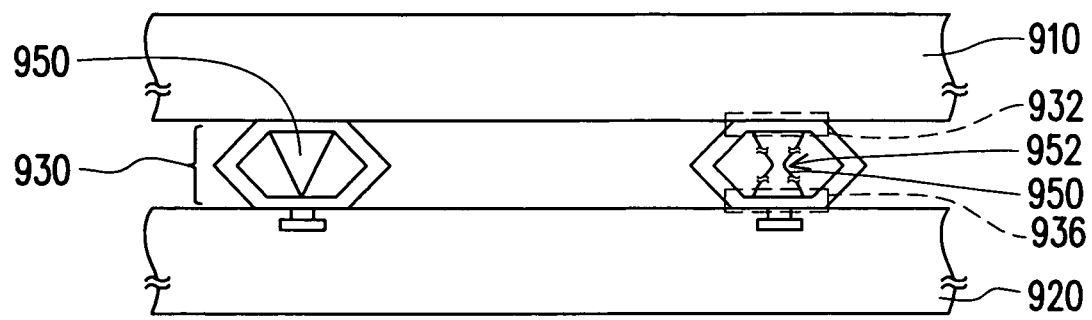
FIG. 10 is a partial cross-sectional view of a display module in accordance with another embodiment of the present invention.
Figure 11A:
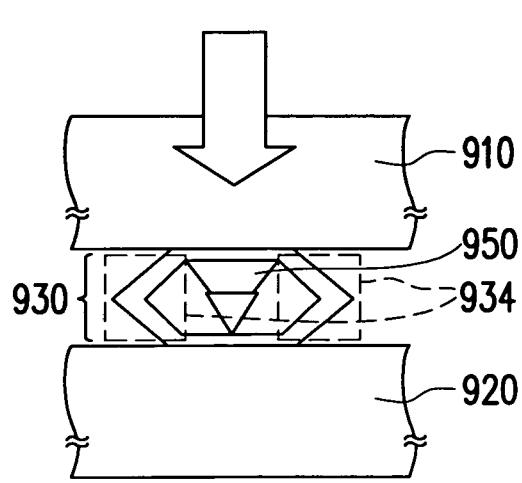
FIGS. 11A and 11B show the operations of the damper structure of FIG. 10.
Figure 11B:
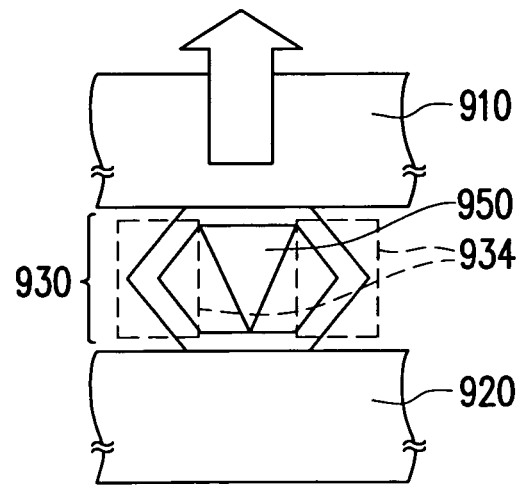

FIG. 10 is a partial cross-sectional view of a display module in accordance with another preferred embodiment of the present invention. To enhance the recovery ability of the damper structure 930 after it receives the stress, a stress-buffering member 950 is disposed between the supporting portion 932 and the fixed portion 936. The material of the stress-buffering member 950 can be plastic or yielding metal. The stress-buffering member 950 can comprise a neck portion 952 such as a sandglass shape or other flexible structure. In addition, FIGS. 11A and 11B show the operations of the damper structure of FIG. 10. As shown in FIG. 11A, when the damper structure 930 is squeezed by the display panel 910 and the peripheral module 920, the middle portion 934 and the neck portion 952 of the stress-buffering member 950 will bend due to the stress and absorb the energy generated between the display panel 910 and the peripheral module 920. Then as shown in FIG. 11B, by the restoring force of the middle portion 934 and the stress-buffering member 950, the display panel 910 will be back to the original position.

In light of the above, there is a damper structure between the display panel and the peripheral module of the display module of the present invention to provide better support and stress buffer in order to enhance the reliability of the display module. The damper structure can be disposed in the horizontal or vertical direction between the display panel and the peripheral module. Hence, the damper structure does not only provide better support to prevent the light leakage from the gap between the display panel and the peripheral module, but also provide better stress buffer during the impact test or other external forces so as to protect the liquid crystal panel from damage. In addition, the damper structure of the present invention can have different shapes depending on the panel size and the design requirement in order to provide different stress buffer ability. In addition, a buffer pad can be disposed between the damper structure and the display panel to prevent the damper structure from damaging the surface of the display panel. Compared to the conventional art, the display module of the present invention provides better support and stress buffer so as to enhance the reliability of the display module.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A display module comprising:
    a display panel
    a peripheral module
    a damper structure disposed between the display panel and the
    peripheral module
    wherein the peripheral module comprises:
        a frame
        a light source disposed on the frame
        the damper structure is disposed around an outer circumference of the frame.

2. The display module of claim 1, further comprising a bezel disposed on the display panel.

3. The display module of claim 1, wherein the damper structure is disposed on a side of the display panel so that the damper structure, the display panel, and a portion of the peripheral module are arranged in a horizontal direction.

4. The display module of claim 1, wherein the damper structure is disposed below the display panel so that the damper structure, the display panel, and a portion of the peripheral module are arranged in a vertical direction.

5. The display module of claim 1, further comprising a first buffer pad disposed between the frame and the display panel.

6. The display module of claim 1, further comprising a second buffer pad disposed between the damper structure and the display panel.

7. The display module of claim 1, wherein the light source is enclosed by the damper structure.

8. The display module of claim 1, wherein the damper structure and the frame are integrated together and the material of the damper structure and the frame comprise one of plastic and metal.

9. The display module of claim 1, wherein the frame comprises a trough which is located around the outer circumference of the frame to accommodate the damper structure having a height larger than a depth of the trough.

10. The display module of claim 1, wherein the damper structure comprises:
   a fixed portion, disposed on the peripheral module;
   a supporting portion, attached to a surface of the display panel; and
   a middle portion, connected to and between the fixed portion and the supporting portion.

11. The display module of claim 10, wherein the damper structure further comprises a locking component disposed between the fixed portion and the peripheral module to lock the fixed portion on the peripheral module.

12. The display module of claim 11, wherein the locking component comprises one of a screw, a wedging indentation and a sliding indentation.

13. The display module of claim 10, wherein the middle portion comprises a supporting component disposed between the supporting portion and the fixed portion.

14. The display module of claim 13, wherein the supporting component comprises a zigzag structure.

15. The display module of claim 10, wherein the damper structure comprises a stress-buffering member disposed between the supporting portion and the fixed portion.

16. The display module of claim 15, wherein the stress-buffering member comprises a neck portion.

17. A display module having a first sub-module, a second sub-module, and a damper element disposed therebetween, wherein the damper element comprising:
   a fixed portion, disposed on the first sub-module;
   a supporting portion, attached to a surface of the second sub-module; and
   a middle portion, connected to and between the fixed portion and the supporting portion, wherein the middle portion comprises a zigzag structure.

18. The display module claim 17, wherein the damper structure comprises a stress-buffering member disposed between the supporting portion and the fixed portion.

19. The display module of claim 18, wherein the stress-buffering member comprises a neck portion.

20. A display module comprising:
   a display panel;
   a peripheral module; and
   a damper structure disposed between the display panel and the peripheral module, wherein the damper structure comprises:
      a fixed portion, disposed on the peripheral module;
      a supporting portion, attached to a surface of the display panel; and
      a middle portion, connected to and between the fixed portion and the supporting portion, wherein the middle portion comprises a zigzag supporting component disposed between the supporting portion and the fixed portion.

* * * * *